Dec. 22, 1942.   W. A. KIMSEY ET AL   2,306,358
PROTECTIVE DEVICE
Filed Aug. 18, 1939   2 Sheets-Sheet 1
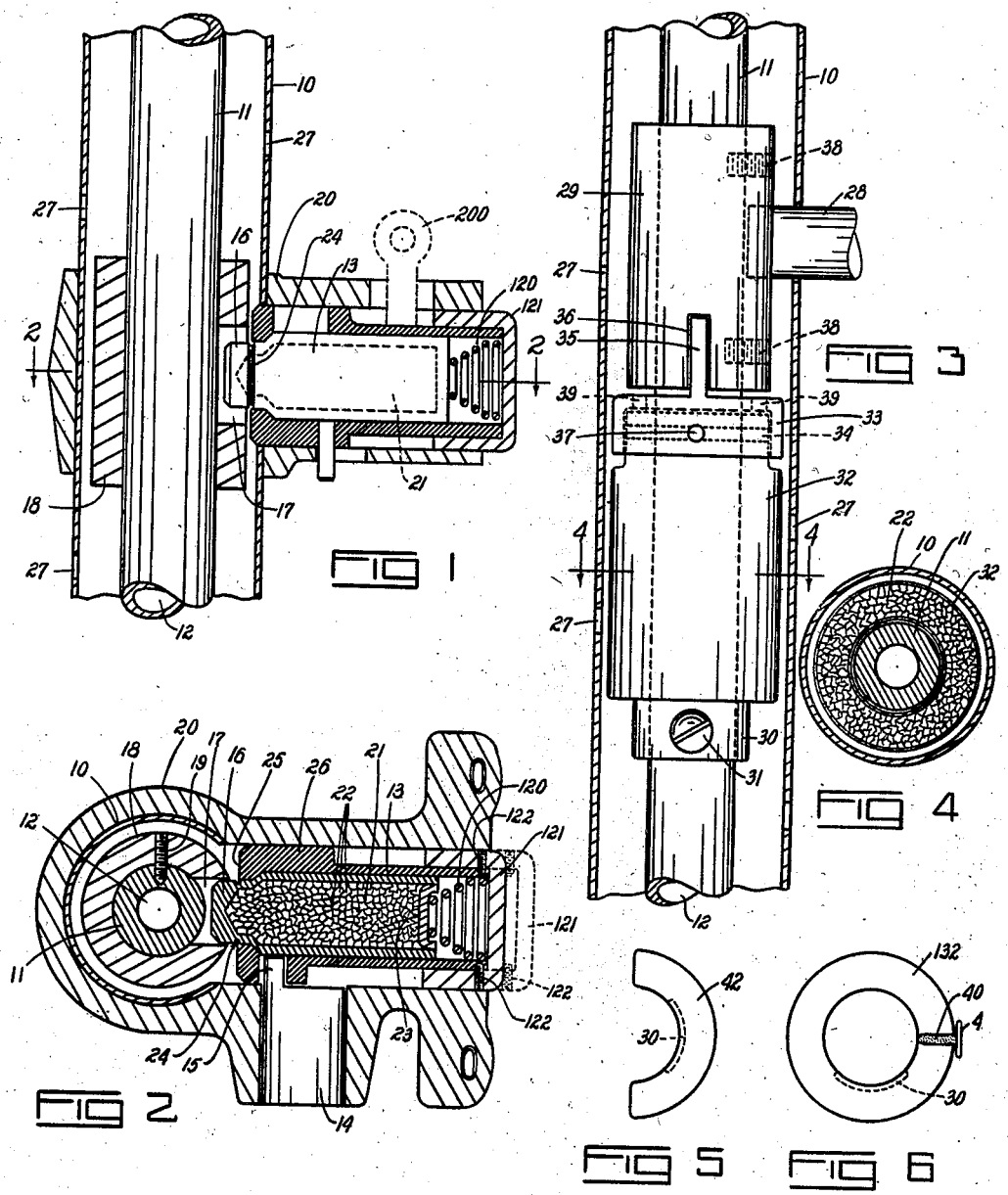
WILLIAM A. KIMSEY
ELMER LAWRENCE
INVENTORS
BY Frank Zugelter
ATTORNEY Dec. 22, 1942.    W. A. KIMSEY ET AL    2,306,358
PROTECTIVE DEVICE
Filed Aug. 18, 1939    2 Sheets-Sheet 2
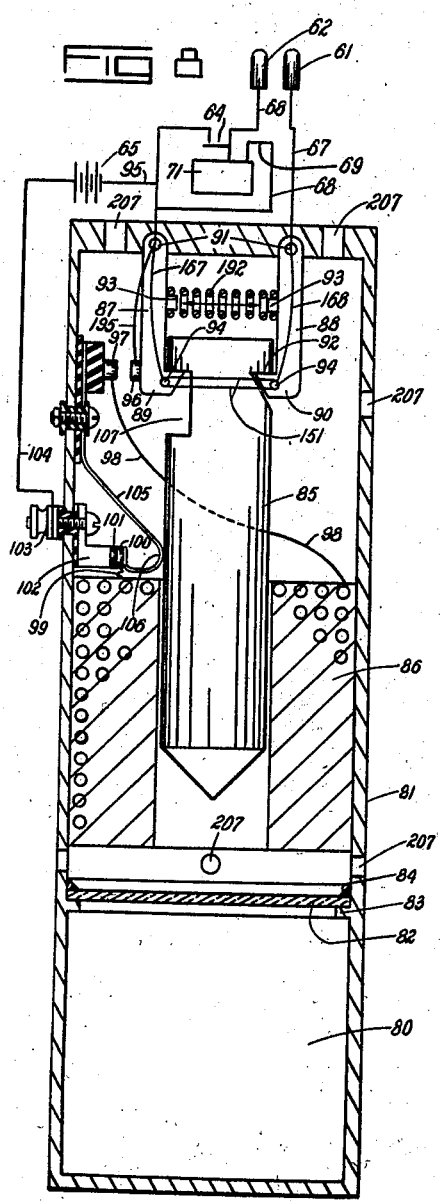
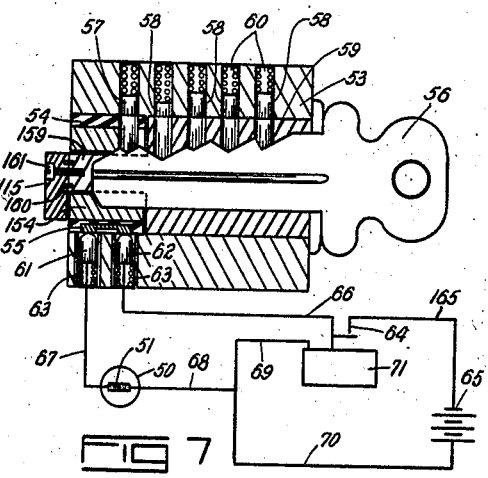
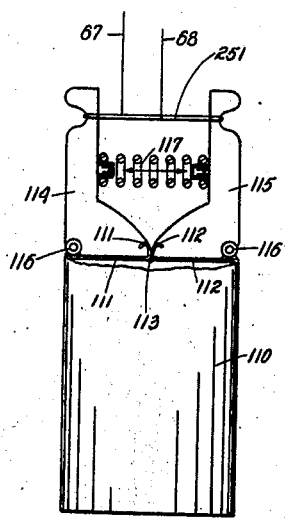
WILLIAM A. KIMSEY
ELMER LAWRENCE
INVENTORS
BY Frank Zugelter
ATTORNEY Patented Dec. 22, 1942

2,306,358

UNITED STATES PATENT OFFICE 2,306,358

PROTECTIVE DEVICE

William A. Kimsey, Mariemont, and Elmer Lawrence, Cincinnati, Ohio; said Lawrence (deceased) by decree of court to Maude Frances Lawrence Application August 18, 1939, Serial No. 290,896

5 Claims. (Cl. 70—416)

This invention relates to a protective device, and more particularly to a protective device in the nature of a frangible gas bomb or cell adapted to be operatively associated with various types of locking devices whereby to augment the effectiveness of said locking devices.

An object of the present invention is to provide a protective device for standard locking devices which is in the nature of a frangible gas bomb or cell, the contents of which is adapted to be liberated upon the failure of the standard locking device.

Another object of the invention is to provide a protective device in the nature of a frangible gas bomb or cell adapted to be associated with the steering post locking mechanism of an automobile or the like.

A further object of the invention is to provide a protective device for the steering column of an automobile which comprises a frangible bomb or cell of noxious gas, the contents of which is adapted to be liberated in the event that the regular steering post locking means is broken.

A further object of the invention is to provide simple yet effective means for securing a frangible gas bomb or cell to the steering post of an automobile whereby the presence of said bomb is undetectable until after the contents of the bomb have been liberated.

Still a further object of the invention is to provide means for securing a concealed frangible gas bomb or cell to the steering column of an automobile so as to preclude accidental discharge of said bomb while the automobile is being operated by an authorized person.

Another object of the invention is to provide a device embodying the above characteristics which may be easily and inexpensively manufactured.

These and other objects are attained by the means described herein and disclosed in the accompanying drawings, in which:

Fig. 1 is a vertical sectional view taken through a steering column provided with a standard locking mechanism showing a protective device embodying the present invention operatively associated with the bolt thereof.

Fig. 2 is a sectional view taken on line 2—2 of the device shown in Fig. 1.

Fig. 3 is a vertical view, partly in section, showing a steering column provided with a modified type of protective device embodying the present invention.

Fig. 4 is a view taken on line 4—4 of Fig. 3.

Figs. 5 and 6 are top plan views of modified forms of protective devices embodying the present invention.

Fig. 7 is a schematic wiring diagram showing a gas cell and a special ignition lock mechanism which comprises a detail of the present invention, operatively associated with a typical automobile generator circuit.

Fig. 8 is an enlarged view, partly in section, of a modified type of gas cell and associated discharge mechanism including a schematic wiring diagram showing the device in a typical automotive generator circuit.

Fig. 9 is a side elevational view of another modification of gas cell embodying the present invention.

At the outset it should be understood that the protective device herein disclosed may be adapted to augment the effectiveness of many types and kinds of locking means, however, by way of example and for the purpose of illustration only, the present invention will be described as a protective device for automobiles.

It has long been common practice to equip automobiles with various types and kinds of protective devices for the purpose of rendering them theft-proof. One extensively used type of protective device comprises a steering post locking means of the general type which comprises a reciprocable bolt member adapted to lock or secure the steering post in an inoperative, nonrotatable condition.

However, experience has shown that such steering post locking means are not effective against a determined thief since the bolts of such locking devices may be sheered off by the application of an excessive turning moment applied to the locking bolt via the steering post, thereby rendering the device useless as an antitheft device.

The present invention is directed, among other things, to the provision of a concealed protective device operatively associated with the regular steering post locking mechanism in such a manner as to be rendered operative and active upon the abuse or failure of the regular steering post locking mechanism.

In the accompanying drawings, the numeral 10 indicates the outer housing for steering post or column 11. It should be understood that the upper end of steering post 11 is provided with a steering wheel, not shown, and that the lower end of said post terminates in a suitable steering gear box, not shown.

Various control devices, such as horn wires, headlight wires, and the like may be housed within and extend longitudinally through the hollow central portion 12 of said steering post, as is the custom.

Steering post 11 may be locked relative to housing 10 and against rotation about its longitudinal axis, by means of bolt member 13. Bolt member 13 may be reciprocated, at right angles to the longitudinal axis of steering post 11, by any suitable means, such as a pin and tumbler or drum type lock of the general character known as Yale locks, indicated by the numeral 14, Fig. 2. Such a lock may include a cam 15 adapted to reciprocate bolt 13 in a manner well known to the art.

It should be understood that the present invention is not directed to nor limited by any particular type or kind of locking or control means for reciprocating bolt member 13.

The outer, keeper-engaging end 16 of bolt 13 is adapted to be received within and engage the recessed keeper portion 17 of an annular lock sleeve 18.

Annular lock sleeve 18 may be secured to steering post 11 by any suitable means, such as set screw 19, Fig. 2. The particular type lock sleeve shown is merely illustrative, and may assume other forms than that shown.

Locking mechanism 14 may be housed within a bracket member such as 20 which is adapted to anchor steering column housing 10 to the dash board not shown, as is the common practice.

It should be observed that the devices and parts hereinabove described comprise standard automotive equipment.

A protective device embodying the present invention may be associated with and be completely concealed within the steering post locking mechanism in the following manner:

The standard, solid bolt member is replaced with a hollow bolt member having a chamber 21 provided longitudinally thereof. One end of chamber 21 terminates within the tip or keeper engaging portion 16 of said bolt, and the opposite end of said chamber may be open, as shown. Chamber 21 is adapted to be filled with a suitable noxious gas, or with noxious gas crystals 22, which readily vaporize when exposed to the atmosphere. The noxious gas or gas crystals 22 may be sealed within chamber 21 by means of a suitable plug member 23.

A groove 24 may be provided circumferentially of the keeper engaging portion 16 of bolt 13 to establish a known area of shear or rupture. Groove 24 is preferably so located relative to the length of bolt 13 as to be in vertical alignment with the plane of the outer edge 25 of bolt guide member 26 when said bolt is in a fully extended, locked, keeper engaging position, as shown in Fig. 2.

From the foregoing it is apparent that in the event that steering column 11 is forcibly turned or rotated when the tip 16 of bolt 13 engages keeper 17, the tip of said bolt will be ruptured at and along the weakened zone defined by groove 24, and the gas within chamber 21 will be liberated.

When the tip 16 of bolt 13 has thus been sheared off, the noxious gas housed within said bolt will be liberated into the space between housing 10 and steering post 11. Suitable apertures such as 27 may be provided at spaced intervals through housing 10 for permitting the noxious gas to freely escape into the interior of the automobile.

It should be understood that any suitable type of noxious gas may be confined within chamber 21, such as tear gas, mustard gas, vomiting gas and the like, the selection of the particular gas used in each case being dependent upon the degree to which it is desired to incapacitate the person attempting to steal the auto. In some instances it may be desirable to provide a harmless gas having an extremely disagreeable odor for the purpose of causing the would be thieves to abandon the automobile in disgust.

It is highly desirable to provide a sufficient thickness of material intermediate the bottom of groove 24 and the inner wall of the chamber 21 so as to preclude the possibility of accidental or unintentional fracture of bolt tip 16 during those periods of time when the bolt is reciprocated during the locking and unlocking operations. Bolt 13 should also be strong enough in shear to withstand the stresses and strains which are induced when an authorized operator deliberately attempts to rotate a locked steering post for the purpose of ascertaining whether the bolt had properly and securely engaged its keeper.

In some instances it may be preferable to locate the noxious gas chamber in the space intermediate the steering post and housing, as disclosed in Figs. 3 and 4. Such an arrangement makes it possible to store a greater quantity of gas than can be stored within chamber 21 of bolt 13, the capacity of which is limited by the size of the bolt.

Such a steering post gas chamber may comprise a hollow right circular cylinder 32 having an aperture disposed longitudinally therethrough for accommodating steering post 11, as shown. Such a chamber may be secured to steering post 11 by means of a bracket such as 30 which may, if desired, be formed as an integral part of chamber 32. Suitable anchorage means, such as screw 31, may be used to anchor bracket 30 to the steering post, as shown.

Gas chamber 32 is preferably so constructed as to fracture in the event that steering post 11 should be deliberately and maliciously rotated against the restraining action of a standard locking bolt 28.

As shown in Fig. 3 a standard, steering post lock bolt 28 is adapted to engage locking sleeve 29 which may be secured to steering post 11 by means of screws 38.

Screws 38 are preferably weak in shear, so that in the event that steering post 11 is deliberately and forcibly rotated for the purpose of shearing off lock bolt 28, the screws 38 will shear off instead. It is readily seen that steering post 11 will be rotatable relative to bolt 28 and lock sleeve 29 after screws 38 have thus been sheared off. This relative motion may be utilized to rupture gas chamber 32 in the following manner.

The upper portion of gas chamber 32 may be suitably constricted to fit within the lower cap-like portion of a connector member 33. The constricted portion of chamber 32 may be provided with a weakened area, shown by the dotted lines 34 which defines a known area of rupture.

Connector 33 is adapted to interconnect the lower portion of lock sleeve 29 with the upper portion of gas chamber 32. An upstanding finger 35 formed integrally with connector 33 may engage a slot 36 provided in lock sleeve 29 so that sleeve 29 and connector 33 are fixed relative to one another. Connector 33 may be secured or anchored to the weakened area 34 of chamber 32 by suitable means, such as a pin 37.

During those periods of time when bolt 28 is retracted out of engagement with lock sleeve 29, gas chamber 32, connector 33, lock sleeve 29 and steering post 11 are adapted to rotate as a unit.

When bolt 28 engages lock sleeve 29, relative rotation between steering post 11 and housing 10 is prevented. However, in the event that a deliberate shearing force should be applied to steering post 11 for the purpose of shearing bolt 28, screws 38 will shear thereby permitting steering post 11 to be rotated within and relative to lock sleeve 29. Since gas chamber 32 is fixed relative to steering post 11, it will be rotated with said steering post even though the upper portion of said chamber is secured against rotation via pin 37, connector 33, finger 35 and recess 36 of lock sleeve 29 to lock bolt 28. Therefore, when steering column 11 is rotated after screws 38 have been sheared off, such rotation will cause pin 37 to tear the upper portion of chamber 32 along the weakened area 34 whereby the gas housed within said chamber will be released through suitable ports 39 provided in connector 33 into the area between the steering post 11 and housing 10 from which it may escape into the interior of the auto via ports 27.

If desired the upper weakened portion of a gas chamber 32 may be secured directly to lock sleeve 29, whereby connector 33 may be dispensed with.

In some instances it may be desirable to provide a gas chamber 132 as disclosed in Fig. 6 in which the known area of rupture is defined by a soldered area such as 40. This soldered area may be ruptured in the event that chamber 132 is rotated relative to lock sleeve 29.

A suitable connector link 41 may be provided for operatively connecting the known area of rupture 40 to lock sleeve 29. Link member 41 may comprise a rigid connector such as a short bar, or it may comprise a flexible connector such as a short piece of chain, cable or wire, adapted to rupture the soldered area 40 when steering post 11 is rotated relative to lock sleeve 29.

In some instances it may be desirable to provide a so-called half section gas chamber as 42, Fig. 5, in lieu of an annular chamber such as 32. Such a half chamber may include a suitable steering post anchorage bracket 30 and be provided with suitable known areas of rupture, such as disclosed in connection with chamber 32. Likewise half chamber 42 may be connected to lock sleeve 29 by means of a connector 33, link 41, or the like.

In some instances it may be desirable to provide two so called half chambers 42 secured together to form an annular chamber such as 32. However, it should be noted that when more than one such chamber is provided suitable means should be provided to liberate the gaseous contents of each chamber.

It should be observed that bolt 13, Figs. 1 and 2, may be extracted from housing 20 when the bolt is in an unlocked position in the following manner. Bolt 13 is normally urged forward, that is, to the left, to snugly engage bolt guide member 26 by spring 120 which extends between chamber plug 23 and cap member 121, as shown. Cap member 121 may be secured to bolt guide member 26 by means of set screws 122, or the like. When the bolt is in a locked position, set screws 122 are disposed within housing 20 as shown; however, when the bolt is unlocked, that is, moved to the right, the bolt guide member 26 and cap member 121 are likewise moved to the right whereby cap 121 assumes the position indicated by the broken lines, Fig. 2, and set screws 122 are rendered easily accessible. By removing set screws 122, cap 121 will be ejected by spring 120, thereby permitting the withdrawal of bolt 13.

In this manner a sheared bolt may be easily extracted or replaced with a new one. Likewise, such construction permits bolts containing different kinds and types of gas to be interchanged at the will of the operator. The customary ignition switch forming part of the steering post locking means is indicated in Fig. 1 by the broken lines 200.

Another extensively used kind of automobile protective device comprises ignition locking means of the general type which comprises a lock controlled electric switch for the automobile ignition system.

Experience has shown that such ignition locks may be rendered ineffective by reason of being picked or wired around so as to isolate the lock switch from the ignition circuit.

Each of the gas cells or chambers disclosed in Figs. 7-9 inclusive, are particularly adapted for use with ignition locking devices. As shown in Fig. 7 a gas cell such as 50 comprising a suitable container provided with a fusible plug 51 may be placed in the ignition generator circuit, as shown. Fusible plug 51 is adapted to be melted, thereby liberating the gaseous contents of cell 50 when the automobile is operated while the regular ignition lock switch has been picked, or wired around.

In order to electrically disconnect gas cell 50 from the generator circuit during those periods of time when an authorized person is driving the auto, a special lock switch 53 is provided. Said lock switch includes means for normally closing the generator circuit to gas cell 50 when the lock is in a locked condition, and for opening said circuit only when an authorized key is used to actuate said lock.

If desired, a standard pin and tumbler ignition lock may be converted into a combination ignition circuit and generator-gas cell circuit switch in the following manner, reference being had to Fig. 7.

A cam 115 provided to actuate a standard automotive ignition switch, not shown, may be operatively secured to shaft 159 which projects from and is an integral part of revolving plug or tumbler 59 of lock 53. Cam 115 may be secured to shaft 159 by means of pins 160 and screw 161, as shown. Lock pins 58 control the rotation of revolving plug 59, said pins being normally urged to engage said revolving plug by means of springs 60, as well known to the art.

It should be observed that when lock pins 58 are elevated by means of an authorized key 56, ignition switch cam 115 may be freely actuated.

The generator-gas cell circuit switch may comprise an insulated sleeve 54 which may, if desired, circumscribe a suitable collar member 154 which may be revolvably mounted to shaft 159, as shown. A narrow conductor strip 55 may be provided in insulated sleeve 54, the opposite ends of said conductor being adapted to be contacted by brushes 61 and 62 when sleeve 54 is in a locked position.

Sleeve 54 is preferably provided with one or more locking pins 57 which prevent the rotation of insulated sleeve 54 relative to revolving tumbler 59 except during those periods of time when said lock pins have been properly elevated, as shown.

All of the lock pins 57 and 58 are adapted to be elevated by an authorized key such as 56 whereby the standard ignition switch may be closed and sleeve 54 simultaneously rotated about the longitudinal axis of shaft 159 to shift connector strip 55 out of contact with brushes 61 and 62, thereby opening the generator-gas cell circuit.

In the event that the lock should be picked, it is highly improbable that the would be thieves would be aware of the presence of the generator-gas cell switch since the standard ignition switch would be rendered operable and their purpose accomplished as soon as the rotating tumbler locking pins 58 had been lifted, therefore the generator-gas cell circuit would remain closed. Likewise the presence of said generator-gas cell switch would remain undetected and the generator-gas cell circuit closed in the event that the standard ignition lock should be wired around as sometimes done by automobile thieves.

Brushes 61 and 62 may be normally urged against the outer periphery of sleeve 54 by means of suitable springs 63, as shown. Brush 62 may be electrically connected to one side of a standard generator 71 by means of conductor 66. Brush 61 may be electrically connected to the other side of generator 71 via conductor 67, fusible plug 51, conductors 68 and 69 as shown. A battery 65 may be connected to generator 71 via conductors 69 and 70, thence from a standard so-called cut out unit 64 back to the battery via conductor 165. In this manner fusible plug 51 is placed in series with the generator circuit when sleeve 54 is locked against rotation, by pin 57.

When the automobile engine is started under these conditions, viz., generator-gas cell circuit closed, the generator current will melt the fusible plug 51 thereby liberating the gas housed within cell 50.

The device shown in Fig. 8 comprises a gas chamber 80 provided in the lower end of closed ended cylindrical housing 81. The upper portion of gas chamber 80 may comprise a frangible or shatterable plate 82 of a suitable brittle substance such as glass, Bakelite, or the like, secured in place against annular lip 83 by means of a sealing ring 84.

Plate 82 is adapted to be shattered by plunger 85 which is driven downwardly in response to energization of solenoid coil 86.

Plunger 85 is normally positioned in spaced relationship with plate 82 by means of levers 87 and 88 each of which terminate in hook members 89 and 90, respectively. The upper ends of levers 87 and 88 may be suitably pivoted as at 91 from housing 81, as shown. Said levers are preferably fabricated from a nonelectrical conductive substance such as Bakelite or the like. Hook members 89 and 90 may engage an annular recessed or undercut portion 92 provided circumferentially of plunger 85, as shown. The lower ends of levers 87 and 88 are normally urged apart by spring 192, the opposite ends of which may be secured to the levers by means of projections 93, as shown.

In order to normally maintain plunger 85 in a raised position, the lower ends of levers 87 and 88 are secured together to engage the undercut portion 92 of plunger 85 by means of a fusible wire 151 which may pass around pins, such as 94 provided in each hook member 89 and 90 as shown.

Conductors 67 and 68 of the generator circuit of Fig. 7, which is duplicated in Fig. 8, are electrically secured to pins 94 by conductors 167 and 168, respectively. Therefore when the generator circuit is closed, via brushes 61 and 62, to fusible wire 151, said wire is melted thereby permitting the lower ends of levers 87 and 88 to spring apart and release plunger 85.

Coil 86 is adapted to be energized by battery 65 simultaneously with the release of plunger 85 in the following manner.

One side of battery 65 is connected to one side of coil 86 by way of conductors 95, and 195 to contact point 96 mounted, as shown, to lever arm 87. Contact point 96 is adapted to make contact with contact point 97 when lever 87 is in a fully extended position, that is, to the extreme left. Coil 86 may be electrically connected to contact point 97 via conductor 98. The circuit is completed to the other side of battery 65 via flexible conductor 99 to contact points 100 and 101, lug 102, binding post 103 and conductor 104, as shown.

Contact point 100 is carried by the free lower end of a strap spring 105, the upper end of which is suitably secured to and insulated from housing 81, as shown. Spring 105 normally urges contact point 100 away from contact 101; however, when plunger 85 is in a raised position, the loop 106 of spring 105 contacts said plunger and the contact points are held together until the plunger has been driven downward at which time loop 106 is adapted to spring into recess 107 of the plunger whereby the contact points are separated and the battery circuit to coil 86 is broken.

The gas within chamber 80 is adapted to be liberated when plate 82 is shattered by plunger 85, the gas escaping into the auto interior via ports 207, provided through housing 81 as shown.

A cell as disclosed in Figs. 7, 8 and 9 may be secreted in the auto top, seats, etc., at a location remote from the ignition switch, if desired.

The device shown in Fig. 9 comprises a gas cell 110 the upper portion of which is closed by means of abutting plates 111 and 112 which are brought into line contact and sealed by means of a solder joint 113. The ends of plates 111 and 112 may be anchored to the lower ends of levers 114 and 115, respectively. Each lever may be pivotally hinged to the upper portion of cell 110 as at 116. The levers are normally urged apart by means of a suitable spring 117, against the counter force of a fusible wire 251 which is secured to the upper, free ends of the levers, as shown. The fusible wire 251 is electrically connected to the generator circuit by means of conductors 67 and 68, as shown.

When wire 251 is melted, levers 114 and 115 will spring apart whereby the soldered connection 113 is ruptured as the abutting edges of plates 111 and 112 are lifted by the lower legs of said levers, thereby liberating the gaseous contents of cell 110.

It should be observed that other methods of releasing the gaseous contents of a gas bomb or cell when the regular ignition lock has been rendered useless may be provided without departing from the spirit of the invention.

In some instances it may be desirable to provide a switch for controlling the generator-gas cell circuit which is completely disassociated from the regular ignition switch. Such a switch may be suitably secreted within the interior of the auto whereby its presence may defy detection.

From the foregoing it is apparent that we have provided a highly efficient protective device to augment the effectiveness of the regular standard locking means, the presence of which is undetectable until said device has been ruptured and the gaseous contents liberated. The manner of providing a well defined area of fracture or rupture may be varied, if desired, and other means of securing or anchoring a gas chamber to a steering post may be resorted to. In some instances it may be desirable to form cylinder 32 of a frangible substance such as glass or the like, in which event said chamber could be fractured by means of a pin projecting from lock sleeve 29.

It should also be noted that the gas bombs hereinabove described may be adapted for use with locks and other securing devices for doors, vaults and the like wherein it is desirable to incapacitate the would be thieves in the event that the regular locking device should be rendered ineffective or useless.

It is to be understood that various modifications and changes in the structural details of the device may be made, within the scope of the appended claims, without departing from the spirit of the invention.

What is claimed is:

1. The combination with an automobile including a rotatable steering assembly including a steering post and associated housing, and steering post locking means comprising a locking bolt adapted for movement to preclude relative rotation between said post and housing, of a gas cell concealed within said bolt, the contents of said gas cell adapted to be liberated into the interior of the automobile upon the rupture of said bolt incident to the rotation of said post against the restraining action of said bolt.

2. The combination with an automobile including a steering assembly including a housing and a steering post extending longitudinally therethrough, and steering post locking means comprising a bolt adapted to be reciprocated at right angles to the longitudinal axis of the steering post for preventing relative rotation between said steering post and housing, of a gas chamber provided interiorly of said bolt, a noxious gas contained within said chamber, said gas chamber adapted to be ruptured for liberating the noxious gas into the interior of the automobile when said bolt is broken when the steering post is forcibly rotated against the restraining action of said bolt.

3. As a new article of manufacture, a bolt for precluding relative rotation between a steering post and its housing by locking said post relative to said housing, said bolt comprising a hollow chamber filled with noxious gas, said bolt including a known area of failure which will rupture under the stresses induced incident to the forcible rotation of said steering post against the locking action of said bolt.

4. The combination with an automobile including a steering assembly including a housing and a steering post extending longitudinally therethrough, and steering post locking means comprising a bolt adapted to be reciprocated at right angles to the longitudinal axis of the steering post for preventing relative rotation between said steering post and housing, of a gas chamber provided interiorly of said bolt, a noxious gas contained within said chamber, said bolt including a predetermined area of shear along which said bolt will fail, said gas chamber adapted to be ruptured for liberating the noxious gas into the interior of the automobile when said bolt is ruptured on said predetermined area of shear when the steering post is forcibly rotated against the restraining action of said bolt.

5. As a new article of manufacture, a bolt for precluding relative rotation between a steering post and its housing by locking said post relative to said housing, said bolt including a chamber filled with noxious gas, the chambered portion of said bolt including a known area of failure which will rupture under the stresses induced incident to a forcible rotation of said steering post against the locking action of said bolt.

WILLIAM A. KIMSEY.
ELMER LAWRENCE.